Nov. 10, 1942.   R. M. GOODALL   2,301,866
FREIGHT CARS
Filed April 8, 1941   2 Sheets-Sheet 1
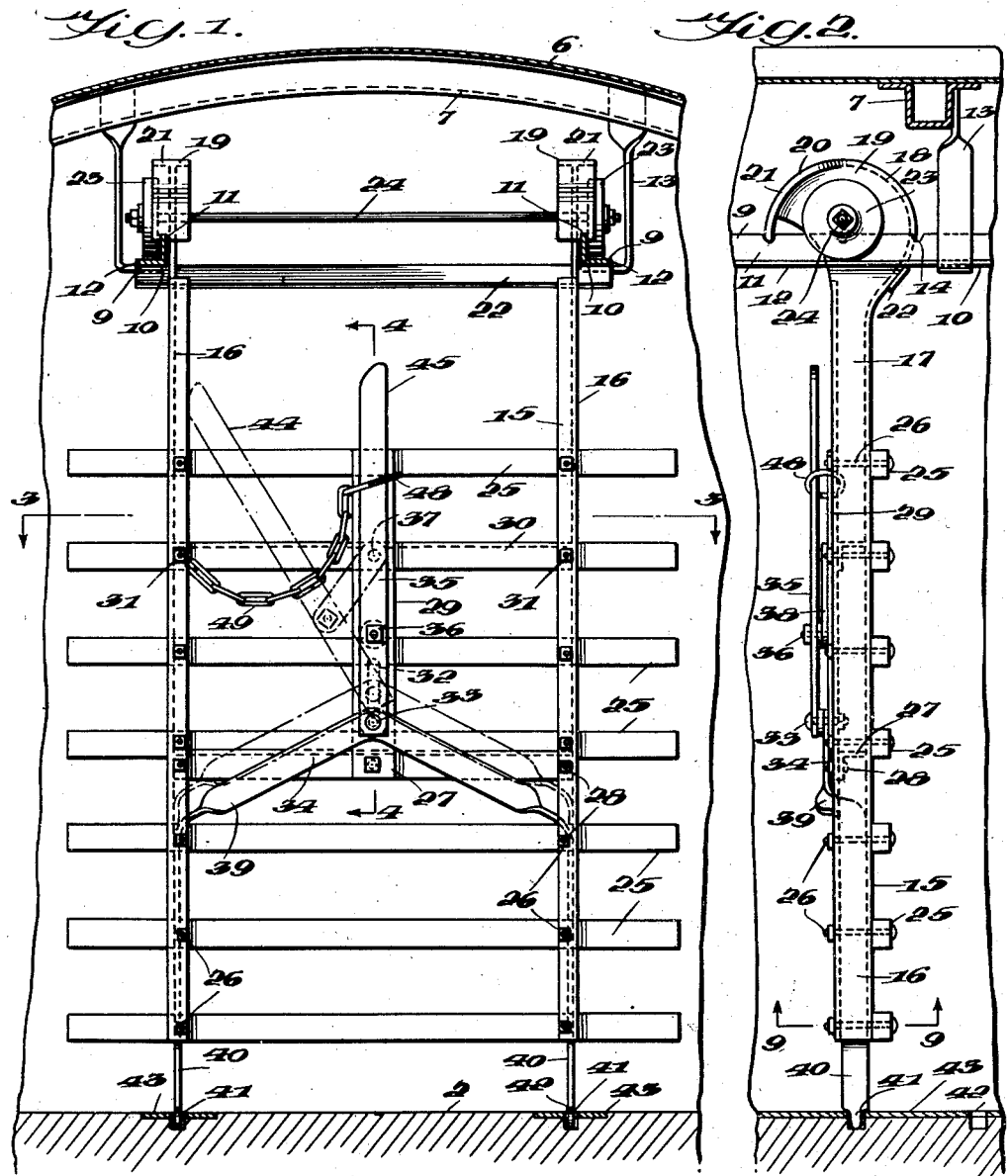
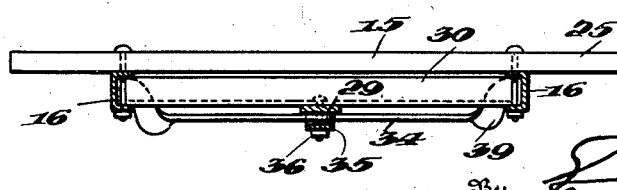
Inventor
RUSSELL M. GOODALL,
his Attorney Nov. 10, 1942.  R. M. GOODALL  2,301,866
FREIGHT CARS
Filed April 8, 1941  2 Sheets-Sheet 2
Fig. 5.
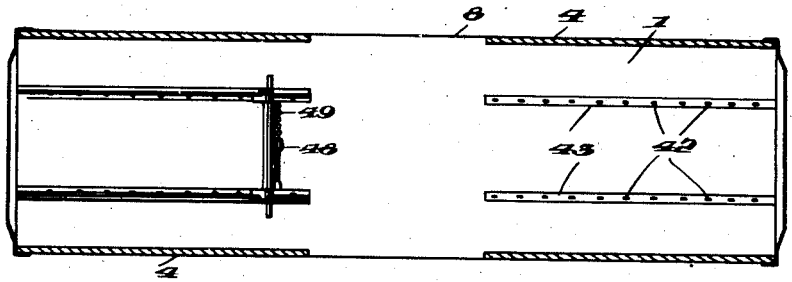
Fig. 6.
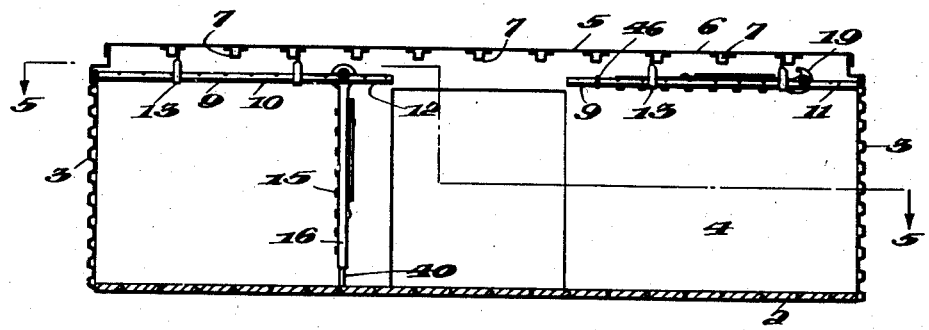
Fig. 4.  Fig. 7.
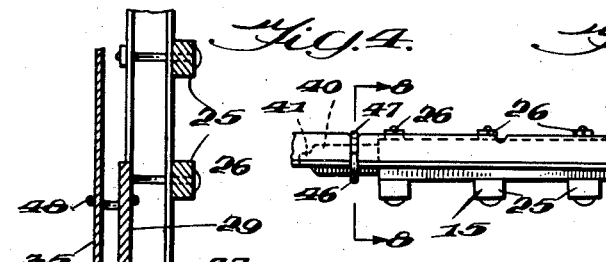
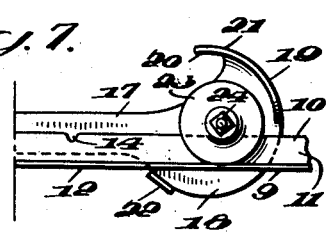
Fig. 8.  Fig. 9.
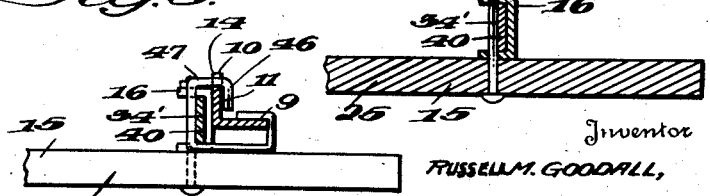
Inventor
RUSSELL M. GOODALL,
By [signature]
his Attorney Patented Nov. 10, 1942

2,301,866

UNITED STATES PATENT OFFICE 2,301,866

FREIGHT CAR

Russell Malphes Goodall, Roanoke, Va.

Application April 8, 1941, Serial No. 387,496

6 Claims. (Cl. 105—369)

The invention relates to freight cars and more particularly to means for preventing the shifting of less than car load lots during the movement of a car, particularly during the stopping, starting and shifting of freight cars.

The principal object of the invention, generally stated, is to provide a box car with movable means positioned adjacent the roof of the car and adapted to be swung to a vertical position to provide means extending transversely of the car for forming bulkheads to engage the freight and prevent relative movement between the freight and the car flooring due to shocks, jolts and other incidents of transportation of freight cars.

Still another object of the invention is to provide a movable bulkhead supported by a car roofing structure and normally maintained in close proximity thereto, said bulkhead being adapted, when swung into a vertical plane, to have an interlocking connection with both the car roofing structure and the car floor to form a rigid transverse member of sufficient strength to prevent the movement of less than car load lots of freight interposed between said bulkhead and the adjacent car end.

Still another object of the invention is to provide a box car with pairs of longitudinally extending rails positioned adjacent to and supported by the car roofing structure and to pivotally and rotatably support, from adjacent pairs of rails, a movable bulkhead, the latter, when swung into vertical position, being adapted automatically to interlock with said rails, said bulkhead carrying means for also interlocking the lower end of said bulkhead to the car floor.

A still further object of the invention is to provide a car roofing structure and a car floor with means for interlockingly engaging the opposite ends of a movable bulkhead when the latter is moved from the horizontal to a vertical position.

A still further object of the invention is to provide a movable bulkhead comprising a pair of standards, said standards being connected at one end by an axle member, said axle member supporting on opposite ends a pair of wheels, said wheels being adapted to rotatably engage a rail supported by the car roof to permit the longitudinal movement of the bulkhead with minimum effort from one point to another as desired.

A still further object of the invention is to provide a bulkhead supported from the car roof structure and movable longitudinally in respect thereof, said bulkhead having means adjacent its point of support for interlockingly engaging said supporting member when said bulkhead is swung from a horizontal to a vertical position.

A still further object of the invention is to provide an adjustable bulkhead so positioned and arranged that when moved from a normal horizontal position to a vertical position on a pivot adjacent its point of support, said bulkhead interlockingly engages said supporting member at points on opposite sides of its axis of rotation.

Other objects of the invention will appear from a more detailed description of the single embodiment of the invention illustrated in the accompanying drawings, in which:

Figure 1 is a vertical cross section of a box car body showing a movable bulkhead in vertical position and interlockingly engaged at opposite ends with the supporting members and the car floor, respectively.

Figure 2 is a view in side elevation of the structure shown in Figure 1.

Figure 3 is a cross section taken on line 3—3 of Figure 1, the arrows adjacent the ends of the section line indicating the direction of view.

Figure 4 is a transverse vertical section taken on the line 4—4 of Figure 1, the direction of view being indicated by the arrows adjacent the ends of said section line.

Figures 5 and 6 are, respectively, a horizontal section and a vertical section of a car body showing one bulkhead in vertical position and the other bulkhead in inoperative position, Figure 5 being taken on line 5—5 of Figure 6.

Figure 7 is a fragmentary view in side elevation showing in detail the pivot means for one of the standards of the bulkhead.

Figure 8 is a transverse vertical section taken on line 8—8 of Figure 7, the direction of view being indicated by the arrows adjacent the ends of the section line.

Figure 9 is a transverse vertical section on the line 9—9 of Figure 2, the direction of view being indicated by the arrows adjacent the ends of said section line.

Throughout the drawings and specification like parts are indicated by like reference characters.

Referring now to the drawings, the numeral 1 designates, generally, the car body having a floor 2, end walls 3, side walls 4, and a roof 5, the latter comprising a roof sheet 6 and a series of flange U-shaped carlines 7. It is to be understood, of course, that the particular illustration of the roof structure is merely diagrammatic and that the invention is not limited to the particular roofing structure illustrated for convenience.

At each end of the car, and preferably extending from each end to a point adjacent the door openings 8, I support from the roof structure a pair of rails 9 which preferably comprise angle bars 10 having flanges 11 thereon extending vertically and the flanges 12 extending horizontally but in opposite directions. Each of these rails may be supported by hangers 13, each of the latter being welded to a vertical web of a carline and having the lower extremity extending under the respective horizontal flanges of the rails 9 and suitably connected thereto, also preferably by welding. The vertical flanges 11 are provided at spaced points with notches 14, the object and purpose of which will hereinafter be described.

The movable bulkheads 15 each comprises standards 16 which are preferably of channel form, the openings of the standards of each bulkhead facing toward each other. At points adjacent the upper ends, the vertical web 17 of each standard is increased in area, as indicated at 18, so as to form a semi-cylindrical end portion 19 and the end portions 19 are preferably provided with a marginal flange 20, said flange forming with the web 17 a T-shaped or claw type member 21, the extremity of said flange 20 being of such size as to engage in one of the notches 14 when the standards are swung to vertical position. At a point adjacent the upper end the standards are preferably connected by a flat bar 22 which may, and preferably is, welded to one flange of the channel member of each standard.

It will be noted from an inspection of Figure 2 that when the standards are swung to vertical position the upper edge of the bar 22 engages the horizontally extending flange 12 of the angle bars 10 and that the end of the flange 20 at the same time seats within the corresponding notch in the flange 11 of the channel bar.

The wheels 23 mounted on the outer ends of the axle 24, which extends through suitable openings provided in the enlarged heads 18 of each standard and by which wheels 23 the bulkhead is adapted to be moved with little effort to the proper position longitudinally of the rails 9, are mounted eccentrically so that when the standards are swung to vertical position and the flanges 20 engage in the notches 14, the wheels are lifted from their engagement with the flanges 12 so as not to interfere with the locking action above described.

In addition to the bar 22, the standards 16 are connected at a plurality of spaced points by transversely extending bars 25, the inner faces of said bars being adapted to engage the freight and maintain it in packed position. A convenient means for securing the bars 25 in position is illustrated and comprises a plurality of bolts 26, each of which is adapted to pass through suitable openings provided in the flanges of the channel members 16 and through the adjacent portion of the bar 25.

At a suitable point intermediate the ends of the standards I further connect the same by means of an angle iron 27, the latter having its end portions extending within the channels of each pair of standards and being riveted or otherwise suitably connected to the inner face of one of said flanges, as is indicated at 28. Rigidly connected to the mid point of the upright flange of the angle bar 27 and extending upwardly therefrom I provide the bar 29 and I connect the mid point of this bar with the standards 16 by means of an angle bar 30, the ends of which are likewise connected to one of the flanges of each of the standards, as indicated at 31.

At a point adjacent its lower end the bar 29 is slotted, as shown at 32, to slidably receive therein a pintle member 33 by means of which the upper extremity 34 of the locking means or member 34' for the lower end of the bulkhead is secured. To the outer end of the pintle 33 is pivotally connected a bar or operating lever 35, the latter being connected by means of pintles 36 and 37 and a link 38 with the bar 29. The locking member 34' preferably comprises a yoke-shaped member 39 which may be formed from a single bar, the extremities 40 of the said yoke being adapted to slide in each channel of the respective standards, the portion 34' of the locking member being formed by giving to the mid-section of the yoke a ninety degree (90°) twist, as is clearly indicated in Figures 1 and 2. At their extreme lower ends the locking bars 20 are provided with reduced portions 41 which are adapted to engage in seats or recesses 42 formed in the floor 2 and in the cover plates 43.

It will be readily apparent, by the movement of the operating rod 35 from the inclined position shown at 44 in Figure 1 to the vertical full line position 45, that the locking portions 41 will be moved downwardly so as to seat in the recesses 42 and conversely that upon movement of the operating lever 35 from the full line position to the dotted line position, the locking portion 41 will be raised so as to clear the cover plate 43 so that the bulkhead may be swung in a clockwise direction to a horizontal or inoperative position. In order to maintain the bulkhead in inoperative position I support on each rail 9 a link member 46, each link being adapted to slide over the portions 40 of the locking member and by forming the links of a size to permit the arms 47 thereof to engage in the respective notches 14 I maintain the bulkhead in raised or inoperative position, the engagement between each link and the adjacent notch serving to maintain the link against vibration and unintentional movement.

In order to maintain the lever 35 in upright position I provide a link 48 which is adapted to embrace the upper portion of the bar 29 and the operating rod 45 and to thus interlock the two members in vertical position. The link can be conveniently secured to the bulkhead by means of a chain or other suitable connection 49.

From the foregoing description it will be apparent that I have provided a movable and adjustable bulkhead and by properly positioning the openings 42 in relation to the alined pairs of notches 14 I am enabled to move the bulkhead to the desired position and to firmly and securely interlock both the upper and lower ends of the bulkhead against relative movement with reference to the car, and that when it is desired to unload the freight between the bulkhead and its adjacent car end it is only necessary to move the operating rod or lever 35 so as to release the locking members 41 from the car floor and to then swing the bulkhead into a horizontal position where the same may be secured by means of the links 46 and that when the bulkhead is in horizontal position the car may be utilized without reference to the bulkheads since the same are above the clearance line and therefore entirely out of contact with any freight with which the car may be loaded.

Having thus described my invention, what I claim as new and desire to secure by Letters Patent, is:

1. In a railway box car, the combination of, rails suspended from a roof of said car, a bulkhead comprising spaced standards, wheels journaled to an upper extremity of said standards and movable along said rails, said bulkhead being rotatable about an axis coincident with the axis of said wheels, upwardly opening notches in said rails, means formed on said standards adapted to be moved into said notches upon rotation of said bulkhead in one direction for locking said wheels against movement, means secured to said standards below said rails adapted to be moved into engagement with said rails coincident with the engagement of said first named means upon the rotation of said standards into vertical position, recesses in the floor of said car, and means slidable in said standards adapted to extend into said recesses for maintaining the lower extremity of said bulkhead in a predetermined position.

2. In a railway box car, the combination of, rails suspended from a roof of said car, a bulkhead comprising transversely spaced standards, wheels journaled to an upper extremity of said standards and supported by said rails, said bulkhead being rotatable about an axis coincident with the axis of said wheels, claw-shaped members formed on upper extremities of said standards, a bar secured to said standards beneath said rails, said claw-shaped members and bar being adapted to bind said rails therebetween upon a rotation of said bulkhead in one direction, a yoke slidably associated with said standards, means on said yoke adapted to be inserted into recesses in the floor of said car for maintaining the lower extremity of said bulkhead in a predetermined position, and lever means associated with said yoke for urging said yoke means into and out of engagement with said recesses.

3. In a railway box car, the combination of, rails suspended from a roof of said car, a bulkhead comprising transversely spaced standards, horizontal means secured to said standards for engaging material carried by said car, wheels journaled to an upper extremity of said standards and supported by said rails, said bulkhead being rotatable about an axis coincident with the axis of said wheels, claw-shaped members formed on upper extremities of said standards and overlying said rails, a bar secured to said standards beneath said rails, said claw-shaped members and bar being adapted to bind said rails therebetween upon a rotation of said bulkhead in one direction, a yoke extending between said standards, means on said yoke adapted to be inserted into recesses of a floor of said car for maintaining the lower extremity of said bulkhead in a predetermined position, and lever means pivotally secured to said yoke for urging said yoke means into and out of engagement with said recesses.

4. In a railway box car, the combination of, rails suspended from a roof of said car, a bulkhead comprising spaced standards, wheels journaled to said standards and movable along said rails, said bulkhead being rotatable about an axis coincident with the axis of said wheels, upwardly opening notches in said rails spaced longitudinally thereof, means formed on said standards adapted to occupy some of said notches upon a rotation of said bulkhead in one direction, means secured to said standards below said rails and adapted to engage the latter coincident with the engagement of said first named means upon the rotation of said standards into vertical position, recesses in a floor of said car, means slidable in said standards adapted to extend into said recesses for maintaining the lower extremity of said bulkhead in a predetermined position, and movable means associated with said rails and adapted to occupy other of said notches for supporting said bulkhead in horizontal position.

5. In a railway box car, the combination of, rails supported by a roof of said car, a bulkhead comprising transversely spaced standards, wheels journaled to said standards and supported by said rails, said bulkhead being rotatable about an axis coincident with the axis of said wheels, T-shaped members forming upper extremities of said standards, notches formed in said rails for accommodation of said T-shaped members, bar means secured to said standards below said rails and being adapted to react vertically against said rails upon a rotation of said bulkhead in one direction, a yoke extending between and slidably associated with said standards, means on said yoke adapted to be projected into recesses in a floor of said car for maintaining the lower extremity of said bulkhead in a predetermined position, and lever means carried by said standards and pivotally connected to said yoke for urging said yoke means into said recesses.

6. In a railway box car, the combination of, rails suspended from the roof of said car, a bulkhead comprising spaced standards, wheels journaled to an upper extremity of said standards and movable along rails, said bulkhead being rotatable about an axis coincident with the axis of said wheels, upwardly opening notches in said rails, means formed on said standards concentric with the axis of rotation thereof adapted to be moved into said notches upon a rotation of said bulkhead in one direction for locking said wheels against movement, means secured to said standards below said rails for locking said standards against vertical movement, recesses in the floor of said car, and means slidable in said standards and adapted to extend into said recesses for maintaining the lower extremity of said bulkhead in substantially vertical position.

RUSSELL MALPHES GOODALL.